United States Patent [19]

Bodnar

[11] 4,036,074

[45] July 19, 1977

[54] ANTI-BACKLASH GEAR SYSTEM

[76] Inventor: Ernest Robert Bodnar, R.R. 1, Kingsworth Road, Kingcross Estates, King City, Ontario, Canada

[21] Appl. No.: 618,630

[22] Filed: Oct. 1, 1975

[51] Int. Cl.² .................... F16H 55/18; F16H 35/08
[52] U.S. Cl. .................................. 74/409; 74/403; 74/440
[58] Field of Search ............... 74/409, 403, 402, 401, 74/400, 395, 440

[56] References Cited

U.S. PATENT DOCUMENTS

| 2,273,784 | 2/1942 | Kahl | 74/440 |
| 3,037,396 | 6/1962 | Martin | 74/409 |
| 3,405,580 | 10/1968 | Hallden | 74/409 X |
| 3,636,789 | 1/1972 | Geiger | 74/409 |
| 3,793,899 | 2/1974 | Bourbonnaud | 74/409 X |

Primary Examiner—Leonard H. Gerin
Attorney, Agent, or Firm—George A. Rolston

[57] ABSTRACT

An anti-backlash gear system for use between a drive shaft and a driven shaft and wherein one said shaft is provided with a gear having helical teeth thereon, said anti-backlash system comprising a gear portion fixed to the other said shaft, and meshing with said helical gear, said gear portion having a width less than the width of said helical gear, a movable gear portion, slidably mounted on said shaft, and being slidable therealong towards and away from said fixed gear portion, said movable gear portion having a width less than that of said helical gear, and having helical teeth meshing therewith, spring means engaging said movable gear portion, and urging the same normally away from said fixed gear portion, and adjustable means for moving said movable gear portion towards said fixed gear portion, against the pressure of said spring.

3 Claims, 3 Drawing Figures

ANTI-BACKLASH GEAR SYSTEM

The invention relates to an anti-backlash gear system, and is a Continuation-In-Part of U.S. application Ser. No. 547,365 entitled "Scrap Chopper".

BACKGROUND OF THE INVENTION

The driving of two or more shafts so that they rotate in a precisely matched manner requires the use of a gearing system having precisely meshed gears. Such a system is required in many different instances. For example, when driving two rollers of a rotary chopping device having blades mounted on rollers, the blades being required to meet and overlap to provide a cutting action, it is desirable that the gears connecting the two drive shafts shall be driven through gears in which there is no backlash. While this condition may be possible to achieve with new gearing, as the system wears, it is desirable to provide some means to take up any backlash.

In the past, systems have been available in which two gear halves having straight teeth were provided for taking up the backlash, one gear half being capable of being adjustably rotated relative to the other. However, such systems are not entirely satisfactory, and result in the development of considerable wear on one or other gear half. They also result in uneven wear occurring on the meshing gear.

BRIEF SUMMARY OF THE INVENTION

The invention therefore seeks to overcome the foregoing disadvantages by the provision of an anti-backlash gear system for use between a drive shaft and a driven shaft and wherein one said shaft is provided with a gear having helical teeth thereon, said anti-backlash system comprising a gear portion fixed to the other said shaft, and meshing with said helical gear, said gear portion having a width less than the width of said helical gear, a movable gear portion, slidably mounted on said shaft, and being slidable therealong towards and away from said fixed gear portion, said movable gear portion having a width less than that of said helical gear, and having helical teeth meshing therewith, spring means engaging said movable gear portion, and urging the same normally away from said fixed gear portion, and, adjustable means for moving said movable gear portion towards said fixed gear portion, against the pressure of said spring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
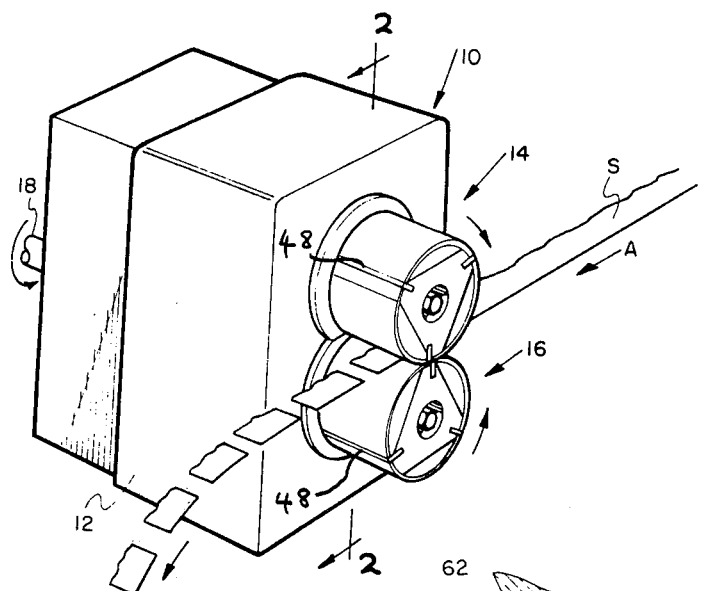
FIG. 1 is a perspective illustration showing a roll unit embodying an anti-backlash gear system according to the invention.

Referring now to FIG. 1, for the purposes of illustration only, a chopper roll unit 10 is shown consisting of a housing 12, and upper and lower chopper rolls 14 and 16 driven through a single drive shaft 18 extending out of the rear of housing 12. A portion of steel strip is shown as S, passing between the upper and lower rolls 14 and 16. The strip S as shown is merely the scrap edge portion as trimmed off at a cutter or slitter, forming part of a complete sheet metal working line (not shown).

The anti-backlash gear system according to the invention is employed in the driving of the rolls 14 and 16 in the manner to be described below. However, it will of course be appreciated that the system might equally well be applied in a great variety of other situations, the present one being merely shown for the sake of simplicity and by way of explanation and without any limitation.

Figure 3:
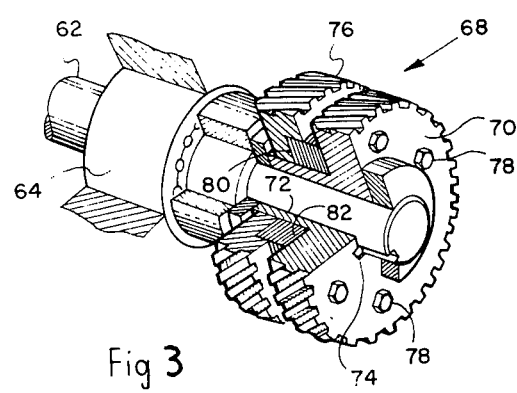
Figure 2:
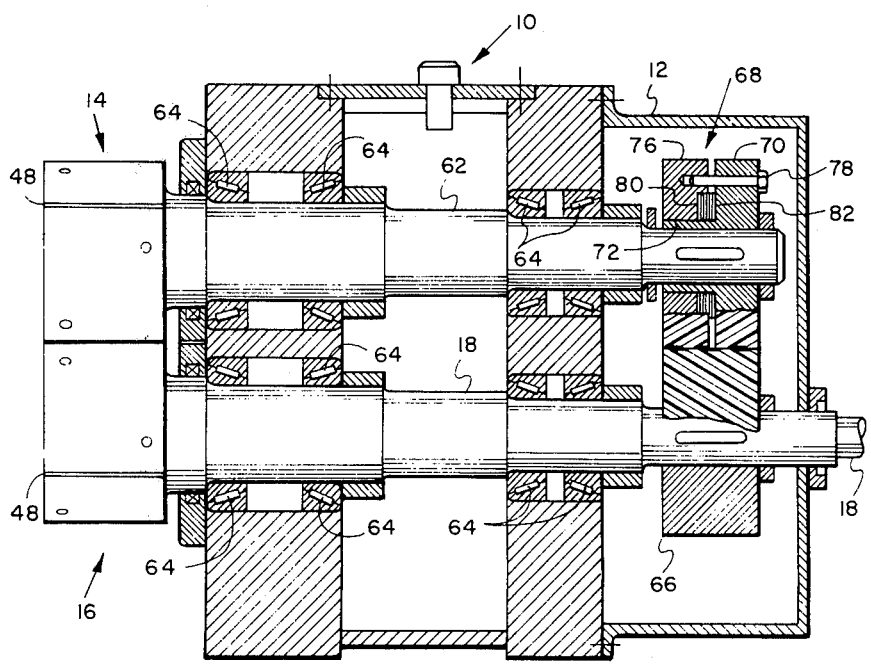
FIG. 2 is an enlarged sectional side elevation along the line 2—2 of FIG. 1, and, FIG. 3 is a cut-away perspective illustration of a portion of the anti-backlash gearing system.

Referring now to FIGS. 2 and 3, it will be seen that the lower roll 16 is mounted on the drive shaft 18, and the upper roll 14 is mounted on a driven shaft 62. The drive shaft 18 is seen to extend completely through the housing 12 from one end to the other, and the driven shaft 62 is located within the housing and extends beyond the housing only to the left hand side thereof so that it may carry the other roll 14.

Both drive shaft 18 and driven shaft 62 are carried in suitable roller bearings 64, or any other suitable bearing means which are adequate for the purpose.

Mounted on drive shaft 18 is a helical drive gear 66 and mounted on driven shaft 62 is an anti-backlash gear indicated generally as 68, which is shown in more detail in FIG. 3. The anti-backlash gear 68 will be seen to comprise a fixed gear portion 70 having a sleeve 72 extending therefrom, and keyed to the shaft 62 by means for example of key 74. The fixed gear 70 will be seen to be formed with helical teeth and somewhat less than half the width of the gear 66. It is however of the same diameter and will have the same number of teeth so that both shafts 18 and 62 rotate in the same speeds in opposite directions.

A movable gear portion 76 is slidably located on the sleeve 72, and is adjustably fastened to the fixed gear 70 by means of the bolts 78 extending through the gear 70 and fastening in suitable threaded recesses in the gear 76.

The gear 76 is formed with an annular recess 80, and a spring 82 is located within the annular recess 80, and extends between the gear 76 and the gear 70, normally urging them apart from one another. The gear 76 is also formed with helical teeth and is of the same diameter and has the same number of teeth as the gear 70. The gear 76 is of slightly less than one half the width of the gear 66. In this way, any backlash in the gears may be taken up by simply tightening up the bolts 78 thereby drawing the gear 76 towards the gear 70 and closing up the gap. When new, the two gear halves will be arranged spaced apart more or less as shown. As wear develops and backlash is noticed the bolts 78 are tightened up, closing the gap between the gear halves. This will eliminate clearance between the teeth of the gear 66 and the gear halves, and so eliminate the backlash.

The foregoing is a description of a preferred embodiment of the invention which is given here by way of example only. The invention is not to be taken as limited to any of the specific features as described but comprehends all such variations thereof as come within the scope of the appended claims.

What is claimed is:

1. An anti-backlash gear system for use between a drive shaft and a driven shaft and wherein one said shaft is provided with a gear having helical teeth thereon, said anti-backlash system comprising;

a gear portion fixed to the other said shaft, and having helical teeth meshing with said helical gear, said gear portion having a width less than the width of said helical gear;

a movable gear portion, slidably mounted on said shaft, and being slidable therealong from a spaced apart initial position towards said fixed gear portion into backlash take up relation, said movable gear portion having a width less than that of said helical gear, and having helical teeth meshing therewith;

spring means engaging said movable gear portion, and urging the same normally away from said fixed gear portion, and, adjustable means for moving said movable gear portion towards said fixed gear portion, against the pressure of said spring into said backlash take up relation thereto.

2. An anti-backlash gear system as claimed in Claim 1, wherein said fixed gear portion includes a sleeve extending around said shaft, and wherein said movable gear portion is slidably mounted on said sleeve as aforesaid.

3. An anti-backlash gear system as claimed in Claim 2, including an annular recess formed in the face of said movable gear portion, and said spring means fitting in said annular recess and extending therefrom into engagement with said fixed gear portion, and said adjustable means comprising a plurality of bolts extending between said fixed gear portion and said movable gear portion for drawing said movable gear portion towards said fixed gear portion against the pressure of said spring.

* * * * *